(12) United States Patent
Cester

(10) Patent No.: US 7,005,840 B2
(45) Date of Patent: Feb. 28, 2006

(54) INTERFACE FOR SUPPLYING POWER TO A LOAD FROM AN ELECTRICAL POWER SUPPLY NETWORK

(75) Inventor: Christophe Cester, Blagnac (FR)

(73) Assignee: Technofan, Blagnag (FR)

( * ) Notice: Subject to any disclaimer, the term of this patent is extended or adjusted under 35 U.S.C. 154(b) by 97 days.

(21) Appl. No.: 10/623,865

(22) Filed: Jul. 22, 2003

(65) Prior Publication Data

US 2005/0077886 A1      Apr. 14, 2005

(30) Foreign Application Priority Data

Jul. 26, 2002    (FR) ................................. 02 09561

(51) Int. Cl.
*H01F 17/00*   (2006.01)
(52) U.S. Cl. .................................................. 323/355
(58) Field of Classification Search ................ 323/355, 323/361; 363/148, 152, 153; 307/9.1, 10.1
See application file for complete search history.

(56) References Cited

U.S. PATENT DOCUMENTS

| 4,780,619 | A | * | 10/1988 | Campbell et al. ........... 307/10.1 |
| 4,947,053 | A | * | 8/1990  | Campbell et al. ........... 307/10.1 |
| 5,903,066 | A | * | 5/1999  | Enjeti et al. ................. 307/105 |
| 6,498,736 | B1 | * | 12/2002 | Kamath ........................ 363/44 |

FOREIGN PATENT DOCUMENTS

WO      WO 00 36738        6/2000

OTHER PUBLICATIONS

Sewan Choi et al: "Polyphase Transformer Arrangements with Reduced kVA Capacities for Harmonic Current Reduction in Rectifier Type Utility Interface" Power Electronic Specialists Conference, 1995. PESC '95 Record, 28th Annual IEEE Atlanta, GA, US Jun. 18-22, 1995, New York, NY, USA, IEEE Jun. 18, 1995, pp. 353-359.

* cited by examiner

*Primary Examiner*—Matthew V. Nguyen
(74) *Attorney, Agent, or Firm*—Sughrue Mion, PLLC

(57) ABSTRACT

The power supply interface (10) includes a rectification stage (18), having an autotransformer (40) connected to a power supply network (12), and a signal conditioning stage (20) having an output (28) supplying power to a load (14). The conditioning stage (20) includes a power module (22), for conditioning the power supply signal, and a control module (24) designed to control the power module (22). An autotransformer (40) includes at least one additional winding (62A, 62B, 62C; 64A, 64B, 64C) connected to the control module (24) to supply it with electrical power, the or each additional winding being magnetically coupled to at least one primary winding (44A, 44B, 44C) of the autotransformer (40). The power is supplied to a motor in an airplane.

6 Claims, 1 Drawing Sheet

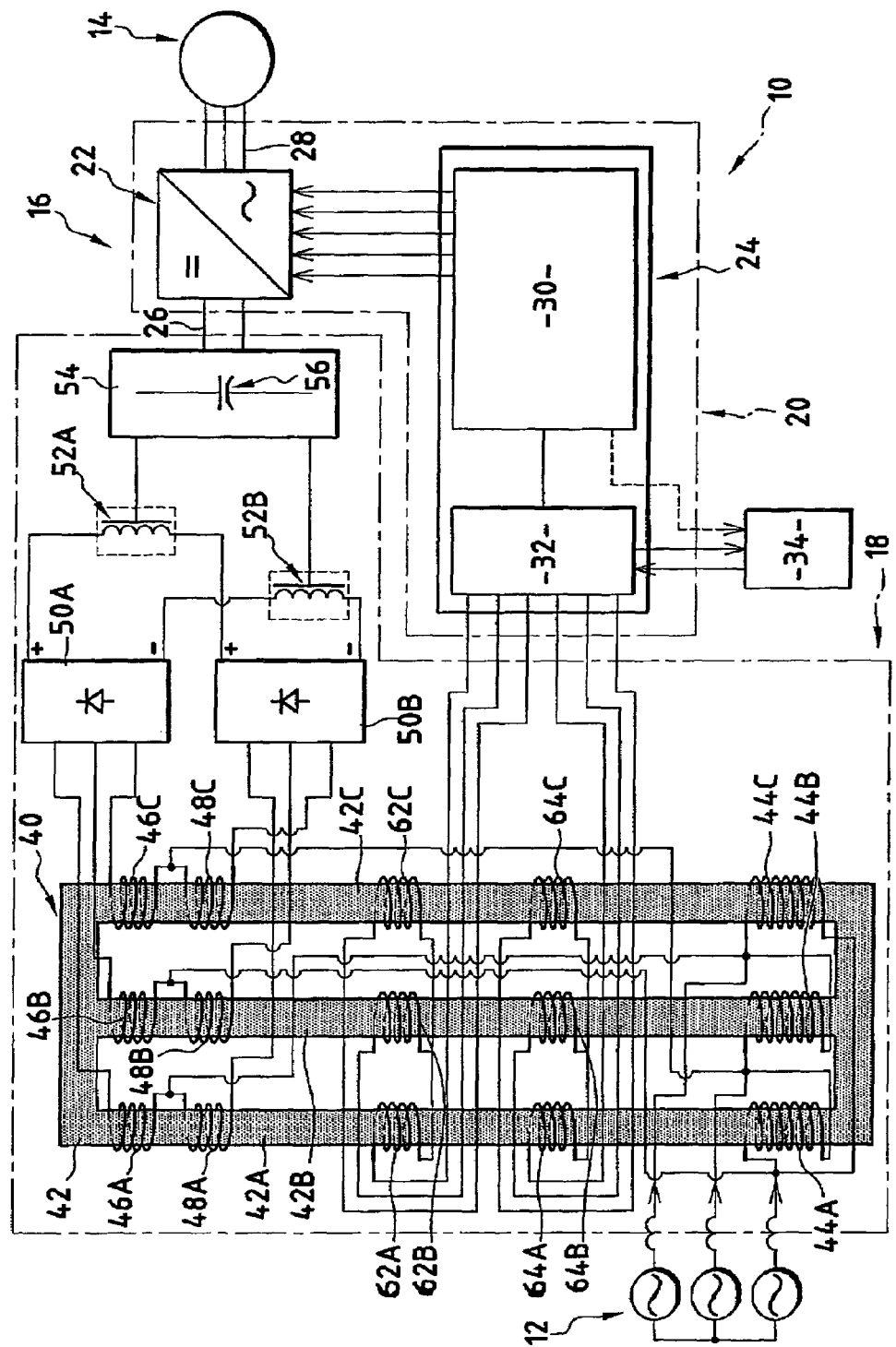

INTERFACE FOR SUPPLYING POWER TO A LOAD FROM AN ELECTRICAL POWER SUPPLY NETWORK

The present invention concerns an interface for supplying power to a load from an electrical power supply network of the type including:

a rectification stage comprising an autotransformer equipped with at least one primary winding designed to be connected to the power supply network; and a power supply signal conditioning stage having an output supplying power to the load, which power supply signal conditioning stage includes a power module for conditioning the power supply signal connected at the output of the rectification stage and a control module designed to control the power module.

In some installations, loads such as, for example, electric motors, are powered from a local electrical power supply network.

This is the case, for example, in an airplane when the airplane is equipped with an internal three-phase network. This network is fed by alternators linked to the aircraft's jet engines. The frequency of the electrical current on the power supply network can be variable.

To supply power to a load, it is known that, between the load and the power supply network, an interface can be provided, this interface rectifying the voltage from the power supply network then conditioning the electrical current to supply the connected load satisfactorily.

In particular, such an interface advantageously includes a rectification stage incorporating a polyphase rectification autotransformer, and in particular a twelve-phase autotransformer.

This autotransformer forms a filter able to limit the harmonics generated on the power supply network by the rectification means. In particular, with such a filter, certain harmonics of the absorbed current can be totally eliminated and the other harmonics can be reduced.

The next stage of the interface conditions the signal. It is formed for example by an inverter. The latter includes a power module containing the electronic components through which the current supplying the load flows and a control module controlling the electronic components of the power module. This control module sometimes also includes other means for controlling and/or powering auxiliary units.

The control module, for its operation, needs to be powered from an isolated low-voltage source from the main electrical power supply network for safety reasons. The control module is thus powered either from a low-voltage network that is separate from the electrical power supply network present in the airplane, or directly from the main electrical power supply network feeding the rectification stage, via a low-power transformer that steps down and isolates the input voltage.

Such a power supply interface is relatively heavy and bulky owing to the separate power supplies required at the rectification stage and at the control module of the electrical current conditioning stage.

SUMMARY OF THE INVENTION

The aim of the invention is to propose an interface for supplying power to a load from an electrical power supply network, which is of a reduced weight.

To this end, a subject of the invention is a power supply interface of the abovementioned type, wherein the autotransformer includes at least one additional winding connected to the control module to supply it with electrical power, the or each additional winding being magnetically coupled to at least one primary winding of the autotransformer.

According to particular embodiments, the power supply interface includes one or more of the following characteristics:

the autotransformer is a polyphase transformer, and it includes at least one additional winding provided for each phase of the transformer;

the autotransformer is a transformer with a six-phase output;

the control module includes a signal shaping module connected to the or to each additional winding; and the autotransformer includes at least two additional windings having different numbers of turns designed to supply power to the control module at two distinct voltages.

Another subject of the invention is a transportation vehicle or engine including an electrical power supply network and at least one load connected to the electrical power supply network via a power supply interface as defined above.

BRIEF DESCRIPTION OF THE DRAWING

The invention will be better understood upon reading the description that follows, given only by way of example, and provided in reference to the drawing which is a schematic diagram of an electrical installation in an airplane incorporating a power supply interface for a load in accordance with the invention.

DETAILED DESCRIPTION OF THE INVENTION

The installation 10 represented is assumed to be incorporated in a transport means, and in particular in an airplane.

This installation includes a power supply network 12, a load 14 connected to the power supply network and an interface 16 placed between the power supply network 12 and the load 14, in order to supply power to this latter.

The load 14 consists for example of a three-phase electric motor. The power supply network 12 consists for example of a three-phase variable frequency power supply network, the rated voltage being for example 115/200 volts.

The power supply interface includes a rectification stage 18 connected to the power supply network 12 and a power supply current conditioning stage 20, the output of which is connected to the load 14. The conditioning stage 20 is connected to the output of the rectification input stage 18 in order to power it.

More specifically, the current conditioning stage 20 consists, in the example being considered, of an inverter having a power module 22 and a control module 24.

The power module 22 is designed to receive a direct current supply at its input labeled 26 and to deliver at the output 28 a three-phase current to supply the load 14. The power module 22 is designed to shape the current being supplied to the load 14 based on control commands received from the control module 24. To this end, the latter includes an information processing unit 30 designed to generate and supply control commands to the power module 22.

The control module 24 additionally includes a current shaping unit 32 designed to receive a low-voltage three-phase alternating current at its input and to supply at its output a low-voltage current suitable for powering the information processing unit 30. Furthermore, the current shaping unit 32 is designed to power auxiliary units 34 that may or may not be controlled from the information processing unit 30 of the control module 24.

The rectification stage 18 comprises a pulse flux autotransformer 40 with a twelve-phase rectification.

A rectification stage of this type is described in its general form in the article "Polyphase Transformer Arrangements with Reduced kVA Capacities for Harmonic Current Reduction in Rectifier-Type Utility Interface" (IEEE Transactions on Power Electronics, vol. 11, No. 5, September 1996, pages 680–690). Thus, for the implementation details, the person skilled in the art will refer to this document and only the elements specific to the invention will be described here in detail.

The autotransformer 40 includes a metal core 42 forming two overlapping magnetic loops delimited by three limbs 42A, 42B, 42C connected to each other by their ends.

A primary winding 44A, 44B, 44C, connected to each phase of the power supply network 12, is wound around each limb 42A, 42B, 42C. These three windings are delta-connected, such that the ends of each winding connected to the power supply network 12 are connected to the output end of another winding.

Furthermore, each limb 42A, 42B, 42C has two secondary windings 46A, 46B, 46C and 48A, 48B, 48C connected in pairs in series. These windings are each connected from their middle point to a phase of the power supply network 12.

The output ends of each pair of secondary windings in series form the six phases of a six-phase power supply network formed at the output of the autotransformer 40.

The outputs of the secondary windings, in groups of three, are connected to the inputs of two diode bridges 50A, 50B.

Outputs of the diode bridges having the same polarity are connected to the two input terminals of interphase inductors 52A, 52B. Each interface inductor consists of a magnetic core around which is wound two windings, the outputs of which are connected together and the inputs of which form the points of connection of the same-polarity outputs of the diode bridges.

The outputs of the two interface inductors are connected to the input of a filtering stage 54 incorporating an energy storage capacitor 56.

The input 26 of the power module 22 is connected to the output of the filtering stage 54 for providing a direct-current supply to the power module.

Furthermore, and in accordance with the invention, the control module 24 of the current conditioning stage 20 is supplied with low-voltage current from a group of additional windings wound around branches 42A, 42B, 42C of the autotransformer.

More specifically, the autotransformer 40 has, on each of its branches 42A, 42B, 42C, three windings 62A, 62B, 62C connected together in star form a first common end, the other end of each winding being connected to the current shaping unit 32 of the control module 24. These windings all have the same number of turns.

Furthermore, three other additional windings 64A, 64B, 64C are wound around branches 42A, 42B, 42C. These windings each have an equal number of turns that is different from the number of turns of windings 62A, 62B, 62C. These windings are also star-connected and connected to the module 32.

When the autotransformer 40 is supplied from the power supply network 12, some of the power coming from the network is converted to direct-current form and transmitted to the power module 22 for shaping for the purpose of supplying the motor 14.

Furthermore, some of the energy is transmitted to the windings 62A, 62B, 62C and 64A, 64B, 64C owing to their magnetic coupling with the primary windings. The three-phase current developing in these windings is applied to the unit 32 to provide an independent supply to the control module 24.

These two series of three windings supply two different alternating voltages to the control module 24. After the shaping of the currents received, these two currents supply the information processing unit 30 of the control module 24.

Thus, it is understood that with such an arrangement the same magnetic circuit of the autotransformer is used to create isolated three-phase voltage sources from the network supplying power to the control module 24, meaning that the need for an additional transformer, specifically for an isolated power supply to the control module 24, is eliminated. Thus, the weight of the power supply interface is reduced.

The invention has been described here with reference to a transformer with a six-phase output. However, the invention can be implemented using a transformer with nine output phases.

Moreover, a single additional winding can be provided in the autotransformer, thus creating a single-phase power source for the control module 24.

What is claimed is:

1. An interface (10) for supplying power to a load (14) from an electrical power supply network (12) comprising:
   a rectification stage (18) comprising an autotransformer (40) equipped with at least one primary winding (44A, 44B, 44C) designed to be connected to the power supply network (12); and
   a power supply signal conditioning stage (20) having an output (28) supplying power to the load (14), which power supply signal conditioning stage (20) includes a power module (22) for conditioning the power supply signal connected at the output of the rectification stage (18) and a control module (24) designed to control the power module (22),
   wherein the autotransformer (40) includes at least one additional winding (62A, 62B, 62C; 64A, 64B, 64C) connected to the control module (24) to supply it with electrical power, the at least one additional winding (62A, 62B, 62C; 64A, 64B, 64C) being magnetically coupled to at least one primary winding (44A, 44B, 44C) of the autotransformer (40).

2. The power supply interface as claimed in claim 1, wherein the autotransformer (40) is a polyphase transformer, and wherein it includes at least one additional winding (62A, 62B, 62C; 64A, 64B, 64C) provided for each phase of the transformer.

3. The power supply interface as claimed in claim 2, wherein the autotransformer is a transformer with six-phase output (40).

4. The power supply interface as claimed in claim 1, wherein the control module (24) includes a signal shaping module (32) connected to the at least one additional winding (62A, 62B, 62C; 64A, 64B, 64C).

5. The power supply interface as claimed in claim 1, wherein the autotransformer (40) includes at least two additional windings (62A, 62B, 62C; 64A, 64B, 64C) having different numbers of turns designed to supply power to the control module (24) at two distinct voltages.

6. A transportation engine including an electrical power supply network (12) and at least one load (14) connected to the electrical power supply network (12) via a power supply interface as claimed in claim 1.

* * * * *